United States Patent [19]
McRae

[11] Patent Number: 5,475,362
[45] Date of Patent: Dec. 12, 1995

[54] TRACTOR-TRAILER ALARM SYSTEM

[75] Inventor: Jimmy L. McRae, Summerville, Ga.

[73] Assignee: Truckers Alarm System, Inc., Trion, Ga.

[21] Appl. No.: 214,964

[22] Filed: Mar. 16, 1994

[51] Int. Cl.⁶ ................................. B60R 25/00
[52] U.S. Cl. .............. 340/426; 340/425.5; 340/431; 307/10.2; 180/287
[58] Field of Search ............... 340/425.5, 426, 340/431; 307/10.2; 180/287

[56] References Cited

U.S. PATENT DOCUMENTS

| | | | |
|---|---|---|---|
| 2,687,518 | 8/1954 | Helman | 340/426 |
| 3,281,785 | 10/1966 | Oursler | 340/426 |
| 3,703,714 | 11/1972 | Andrews | 180/289 |
| 3,792,435 | 2/1974 | Pace et al. | 340/426 |
| 3,858,175 | 12/1974 | Kopera, Jr. | 340/426 |
| 3,925,756 | 12/1975 | Edwards | 340/450.2 |
| 4,262,277 | 4/1981 | Abonia | 340/471 |
| 4,816,803 | 3/1989 | Brown | 340/431 |

Primary Examiner—Brent A. Swarthout
Assistant Examiner—Edward Lefkowitz
Attorney, Agent, or Firm—Miller & Martin

[57] ABSTRACT

A tractor-trailer alarm system having mounted interior and exterior arming switches arranged in parallel either of which is operated by the tractor driver to arm the alarm system. The alarm system comprises a system of relays connected to the tractor batteries through the arming switches and further comprises a plurality of sensing switches, arranged in parallel, which trigger the relay system when actuated, such as by the unauthorized opening of a door. The relay system, in turn, is connected to one or more warning devices, such as a siren, which provides a warning when the relay system is triggered by the actuation of one of the sensing switches. The relay system is further connected to one or more essential components of the tractor engine, such as the fuel pump, which is disabled by the relay system when the relay system is triggered by one of the sensing switches. Once the relay system has been triggered by one of the sensing switches, the subsequent resetting of the sensing switch will not deactivate the alarm system. This alarm system is specially designed to be compatible with the electrical systems of tractor-trailers and to withstand the harsh environment and punishing conditions to which it will be exposed when installed in a tractor-trailer.

20 Claims, 3 Drawing Sheets

TRACTOR-TRAILER ALARM SYSTEM

BACKGROUND OF THE INVENTION

The present invention relates to alarm systems used to indicate and prevent the unauthorized entry into, the use of, the removal of components or possessions from, or harm to vehicles or the occupants of vehicles. Specifically, the present invention relates to an alarm system for use on tractor-trailers, or other heavy-duty vehicles, which, due to the nature of their ordinary use, suffer extraordinary physical punishment or regularly undergo dramatic climatic changes or both.

The theft of automobiles and of the components of automobiles is a common occurrence and represents one of the largest areas of criminal activity with one of the lowest incidents of perpetrator apprehension. Therefore, prevention and deterrence are the two keys to automobile protection. As the incidence of automobile theft and vandalism and the concomitant costs to owners and insurers have increased, the installation of alarm systems which are triggered upon the opening of car doors, hoods, windows, or gas tanks, or upon the excessive motion caused by touching or otherwise shifting the vehicle from its motionless, parked position, has significantly deterred the theft of automobiles so equipped.

Alarms of this type have become common and are in widespread use on passenger automobiles and light trucks. Typically, alarms of this nature can be installed on any vehicle, including tractor-trailers. However, alarm systems of the type designed primarily for use on passenger vehicles are entirely unsuited for use on heavy-duty tractor-trailers.

Tractor-trailers are put through much more rigorous use than are typical passenger automobiles. Tractor-trailers are driven virtually non-stop, day after day, over enormous distances the likes of which are traversed by ordinary vehicles only infrequently. Because of this heavy use, the normal strain and wear on truck components and systems is much higher than that experienced by automobile components and systems. The constant vibration and jarring associated with driving a tractor-trailer quickly causes components and systems designed for normal automobiles to fail due to breakage, stress, dislocation or disconnection. Accordingly, it is desirable that tractor-trailer components and systems be fashioned from more durable materials and made heavier in weight in order to withstand the much higher average levels of stress and vibration. Further, the corrosive effect of weather and dirt are magnified in tractor-trailers as compared to typical automobiles. Tractor-trailers routinely travel between and through different climates. This constant rapid change in the elements and violent fluctuation of temperatures serves only to exacerbate the corrosive effect of water, dirt and road salt upon the internal and external components and systems of tractor-trailers. Again, typical automotive components and systems are simply not fashioned to withstand the physical punishment taken by the more ruggedly constructed tractor-trailer components and systems.

When alarm systems designed primarily for use on passenger vehicles are installed on a tractor-trailers, the systems generally fail within a year of installation in the more strenuous environment. Constant pounding and jarring works plugs, fittings, connections and even screws loose. Delicate circuit boards and wires easily corrode and short when subjected to constant intermittent periods of dampness and dryness. This corrosive effect is only heightened when combined with the expansion and contraction, as well as condensation, caused by the frequent rapid temperature changes which tractor-trailers encounter as they are driven through differing climes.

Additionally, some modern car alarm systems include motion detectors which trigger the alarm when the vehicle has been rocked. Motion detectors are unsuitable for tractor-trailer alarm systems because the large surface area of the tractor-trailer often acts as a sail, catching the wind and shaking the vehicle even when parked. Therefore, even relatively small gusts of wind have the potential to trigger the motion detector of a typical car alarm system if it is installed on a tractor-trailer, resulting in numerous, annoying false alarms.

Finally, the wiring used in automobile alarm systems is, to a great degree, incompatible for the same use in tractor-trailers. Many car alarm systems require that the system's wiring be substituted for portions of the wiring of the vehicle in which it is installed. On a tractor-trailer, such a substitution is not only useless, as the extreme environment would quickly cause the smaller gauge car alarm system wiring to fail, possibly disabling vital electrical systems of the tractor-trailer in the process, but may also void any manufacturer's warranty on the truck. Clearly an alarm system which voids the more valuable warranty of the vehicle itself is of little practical value to a tractor-trailer owner.

The acceptance and usage of car alarm systems on tractor-trailers has been greatly limited, largely as a result of the high initial purchase price, the high cost of installation, the incompatibility of the wiring used on car alarm systems with the heavier wiring used in tractor-trailers, and, most of all, because of the unreliability of car alarm systems when used in the much higher stress environment of the tractor-trailer.

Furthermore, the security needs of a tractor-trailer and its driver differ greatly from those of the typical automobile and its driver. Besides the typical protection against the theft of the vehicle or its radio, an alarm system for a tractor-trailer must provide protection worthy of a home, for to many tractor-trailer drivers, their cab is literally a second home. Tractor-trailer drivers frequently sleep for long periods of time inside their vehicles. During these times, the exhausted drivers themselves are at great personal risk from the criminals who would break into their cab. Also, in addition to the valuable cargo which he is hauling, the tractor-trailer driver typically has a greater number of valuable possessions in his cab than does the typical automobile driver. Tractor-trailer drivers furnish their cabs with all of the comforts of home, from expensive two-way radios to refrigerators, televisions and VCR's. The presence of these valuable items, plus the large sums of cash which tractor-trailer drivers frequently have on hand to pay for hundred-plus gallon fuel fill-ups and other expenses encountered on trips that may be over a week in duration, make the tractor-trailer and its driver a lucrative target for the professional thief. Therefore, it is imperative that an alarm system for use on a tractor-trailer be capable of being armed from both inside and outside of the cab.

Furthermore, even when the driver is not inside his vehicle, the tractor is frequently left with the engine running, particularly in cold weather. This practice is a necessity of truck driving and only adds to the ease with which a tractor-trailer and its valuable cargo may be stolen.

Finally, notwithstanding the aforementioned reasons for making tractor-trailers as burglar-proof as possible, the manufacturers of tractor-trailers have traditionally used a minimum number of different key patterns for the keys which both lock and start these expensive machines. In fact, it is highly likely that the key to one tractor-trailer will unlock and start a tractor-trailer of similar make and year. This means that a knowledgeable thief can easily obtain the key for almost any tractor-trailer, thereby effortlessly obtaining unauthorized entry and use of the vehicle.

SUMMARY OF THE INVENTION

The present invention, which will be described subsequently in greater detail, comprises a tractor-trailer theft prevention alarm system having as a source of power the batteries of the tractor and which is tied into the existing electrical system of the tractor. The alarm system is armed by the owner through the use of either of two arming switches, one mounted internally and one mounted externally. Either arming switch being in the "on" position electrically connects the tractor batteries to the relay system of the alarm. A plurality of sensing switches, preferably switches which are preexisting in the electrical system of the tractor, are electrically wired into the relay system of the alarm such that the actuation of any of the sensing switches also electrically connects the tractor batteries to the relay system of the alarm. The relay system of the alarm is arranged such that the actuation of any of the sensing switches while either arming switch is "on," electrically connects the tractor batteries to a siren or any of a variety of warning devices and, at the same time, disconnects the fuel pump, ignition switch, or other critical electrical component of the tractor from the batteries, thereby disabling the tractor.

It is therefore a primary object of the present invention to provide a tractor-trailer alarm which is operatively connected to the existing electrical system of the tractor by means of a relay system which is activated in response to the actuation of any one of a plurality of sensing switches strategically located throughout the tractor or trailer, when one of a plurality of arming switches is first positioned in an "on" position.

It is also a primary object of the present invention to provide a tractor-trailer alarm system which, when triggered by the unauthorized use of the tractor, will prevent the operation of the tractor engine.

It is another object of the present invention to provide a tractor-trailer alarm system which is specifically designed for use in conjunction with the electrical systems of tractor-trailers, and will therefore be more reliable when put to such use than will an alarm system designed for automobiles.

It is still another object of the present invention to provide a tractor-trailer theft prevention alarm system which is inexpensive to manufacture and easily and inexpensively installed by most owners of tractor-trailers. To this end, the preferred commercial embodiment of the present invention is sold to purchasers in the form of a kit which includes the alarm system components and simple instructions which the consumer can follow to personally install the alarm system into his or her tractor-trailer.

Other objects, advantages and applications of the present invention will become apparent to those skilled in the art of trucking and tractor-trailer theft prevention alarm systems when the accompanying description of the preferred embodiment of the present invention is read in conjunction with the accompanying drawings.

DETAILED DESCRIPTION OF THE DRAWINGS

Figure 1:
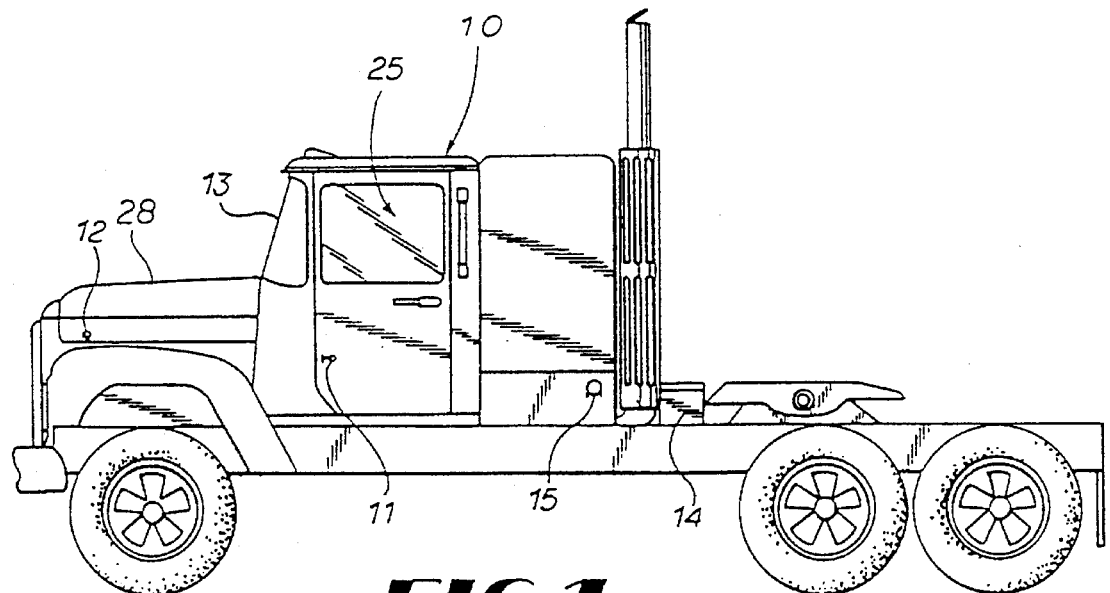
FIG. 1 is a side elevational view of a tractor-trailer tractor having incorporated therein example of the present invention.
Figure 3:
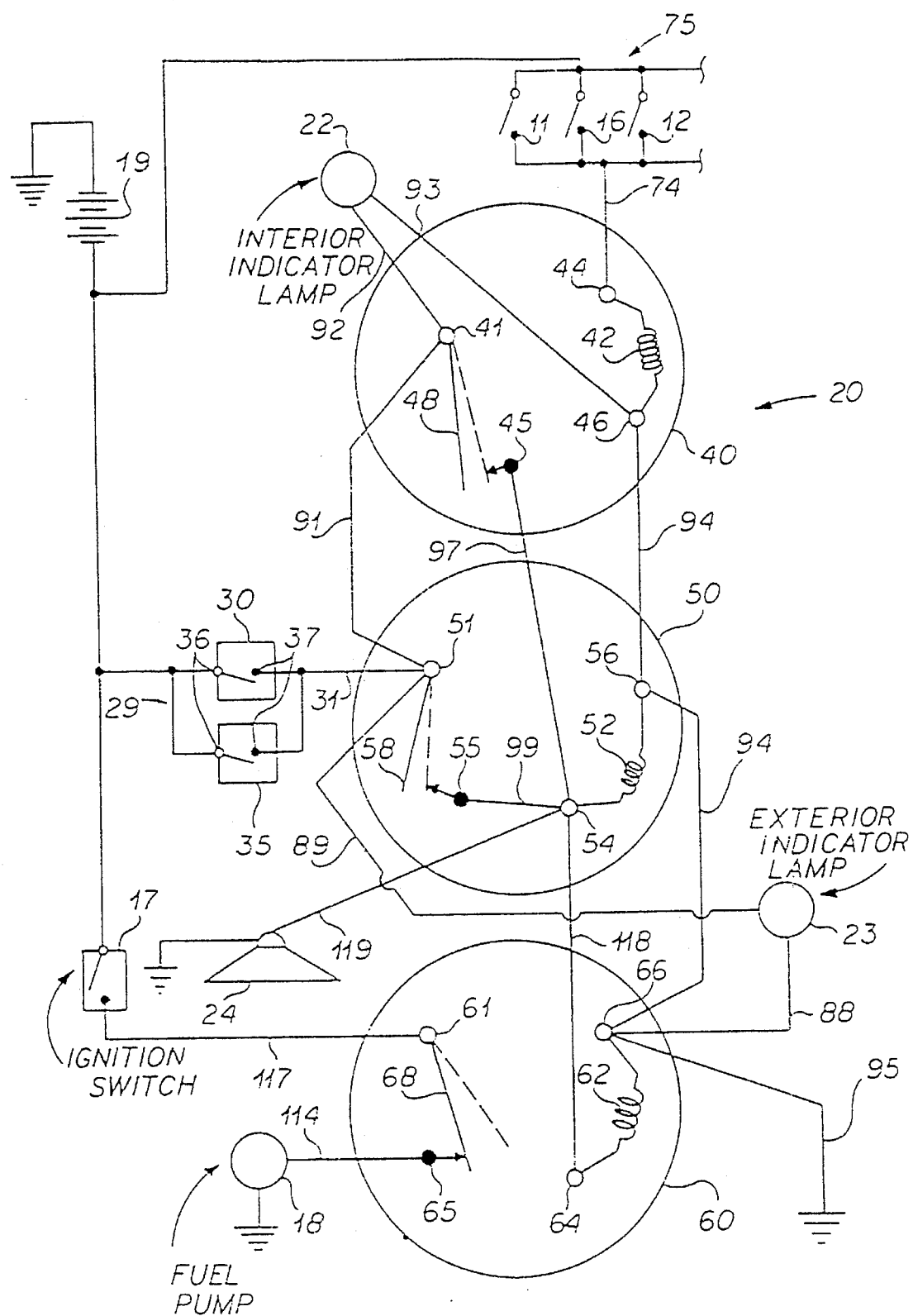
FIG. 3 is a schematic circuit diagram of a preferred embodiment of the present invention.

Referring now to the drawings and in particular to FIG. 1, a conventional tractor 10 into which is incorporated an example of the present invention in the form of a tractor-trailer alarm system 20, shown in schematic form in FIG. 3. However, it is to be understood by those skilled in the art that the present invention has equal application in boats, airplanes, recreational vehicles, heavy-equipment, trailers and other self-propelled or towed vehicles which are subjected to harsh working environments. The tractor 10 shown in FIG. 1 has features common to most tractors 10, such as a cab 25, a hood 28, a windshield 13, one or more gas caps, such as gas cap 15, one or more lockable exterior compartments, such as tool compartment 14, a left door light switch 11, a right door light switch (not shown), and a hood switch 12.

Figure 4:
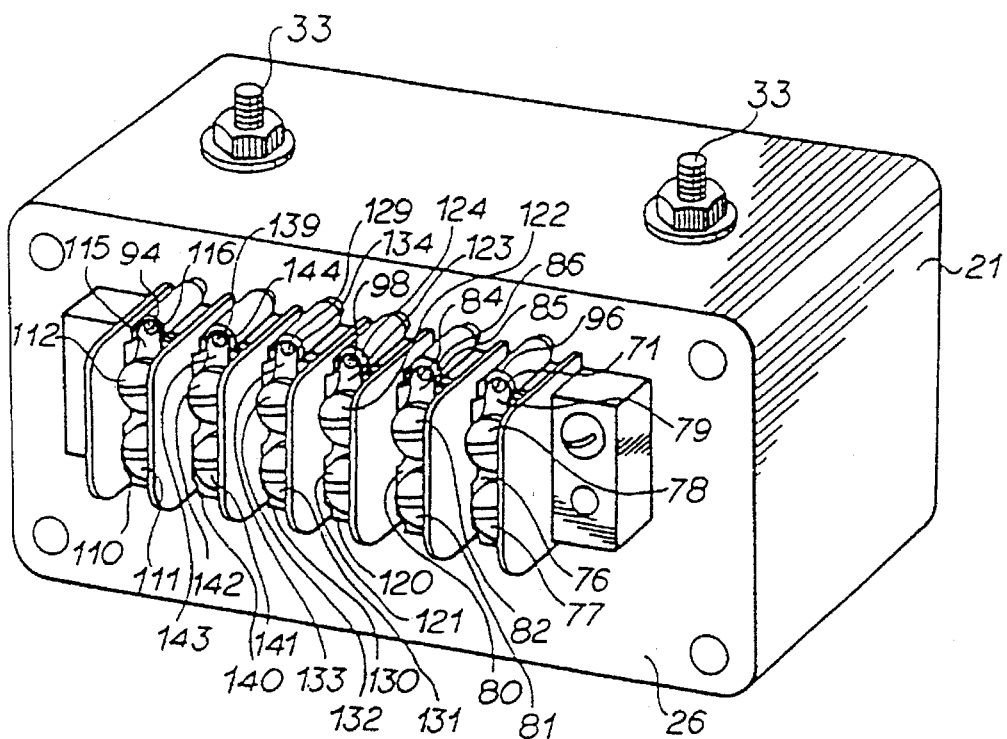
FIG. 4 is a rear perspective view of the control box.
Figure 5:
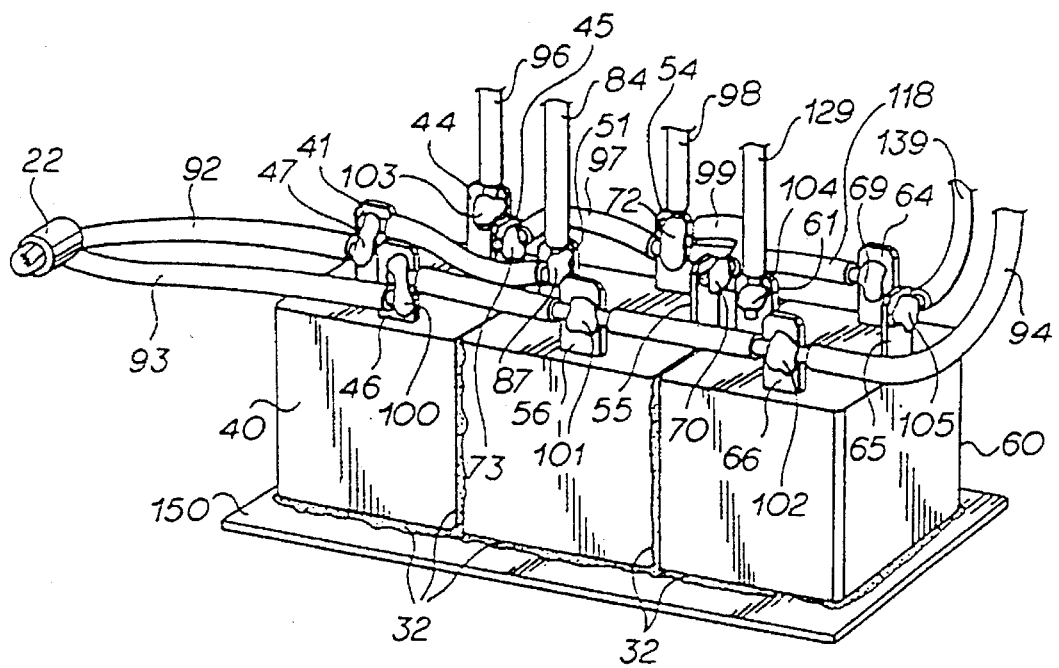
FIG. 5 is a perspective view of the rear face of the control box showing the terminals and wiring of a preferred embodiment of this invention.

The alarm system 20, which is operatively connected into the electrical system (not shown) of the tractor 10, comprises a first circuit including the electrical power supply of the tractor 10, such as one or a plurality of tractor batteries 19, shown schematically in FIG. 3, electrically connected in series to an electromagnetic relay, such as a proximate relay 40 through a plurality of sensing switches 75, described in greater detail hereinafter. The sensing switches 75 are electrically connected in a parallel arrangement to a sensor terminal 76, shown in FIG. 4, located on the rear face 26 of the control box 21 by an electric wire 74, preferably of 14-gauge thickness, which is secured to the sensor terminal 76 by a connector, such as screw 77. The sensor terminal 76, in turn, is electrically connected to the proximate input pole 44, shown in FIGS. 3 and 5, of an electromagnetic relay, such as proximate relay 40, by an electrical wire 96 which passes through the rear face of the control box 26. As shown in FIG. 5, this wire 96 is joined to the proximate input pole 44 by solder 103. As shown in FIG. 4, the opposite end of wire 96 is connected to the sensor terminal 76 by a crimp-lug 79 and connector, such as the screw 78, both of which are fused to both sensor terminal 76 and wire 96 by solder 71. Electrical wiring is preferably of 14-gauge thickness throughout unless otherwise specified, although 18-gauge or even 20-gauge wiring may be suitable.

The first circuit of the alarm system 20 further comprises an electromagnetic relay, such as proximate relay 40, shown in FIG. 3, having a proximate solenoid 42, connected between a proximate input pole 44 and a proximate output pole 46. The proximate relay 40 is preferably a sealed, 40-amp, single pole single throw, four pin, normally open relay having a proximate armature 48 electrically connected to a proximate armature pole 41. When the proximate solenoid 42 is activated, the proximate armature 48 is shifted from its normally open position into contact with the proximate contact pole 45, thereby electrically connecting the proximate armature pole 41 to the proximate contact pole 45.

The first circuit of the alarm system 20 further comprises wire 94 which electrically connects the proximate output pole 46, the medial output pole 56 of a medial relay 50, the distal output pole 66 of a distal relay 60, and the ground terminal 110, shown in FIG. 4, located on the rear face of the control box 26. As shown in FIG. 5, said electrical wire 94 is securely fused to the proximate output pole 46 by solder 100, to the medial output pole 56 by solder 101, to the distal output pole 66 by solder 102, and to the ground terminal 110, shown in FIG. 4, by both a crimp-lug 115 and a connector, such as screw 112 which are, in turn, both fused with solder 116 to both the wire 94 and the ground terminal 110.

Referring again to FIG. 3, the medial relay 50 of the alarm system 20 is preferably a sealed, 40-amp, single pole single throw, four pin, normally open relay having a medial solenoid 52, connected between a medial output pole 56 and a medial input pole 54. The medial relay 50 further comprises a medial armature 58 electrically connected to the medial armature pole 51. When the medial solenoid 52 is activated, the medial armature 58 is shifted from its normally open position into contact with the medial contact pole 55, thereby electrically connecting the medial armature pole 51 to the medial contact pole 55.

The first circuit of the alarm system 20 further comprises a distal relay 60 having a distal solenoid 62, connected between a distal output pole 66 and a distal input pole 64. The distal relay 60 is preferably a sealed, 40-amp, single pole single throw, four pin, normally closed relay having a distal armature 68 electrically connected to a distal armature pole 61. When the distal solenoid 62 is activated, the distal armature 68 is shifted from its normally closed position to an open position out of contact with the distal contact pole 65, thereby electrically disconnecting the distal armature pole 61 from the distal contact pole 65.

Although the relays 40, 50 and 60 are preferably sealed, 40-amp relays, 30-amp relays are sufficiently durable for all but the most demanding usage.

The first circuit of the alarm system 20 is grounded to the body of the tractor 10, shown in FIG. 1, by an electrical wire 95 running to the body of the tractor from the ground terminal, which wire 95 is securely attached to the ground terminal 110, shown in FIG. 4, by the ground input connector 111. Thus in FIG. 3 it can be seen that when any one of the sensing switches 75 are actuated, that is, an electrical connection is completed by the sensing switch 75 between the battery 19 and the proximate input pole 44, the first circuit is grounded and the proximate relay 40 will be activated, meaning that the proximate solenoid 42 will be activated, and the proximate armature 48 shifted to electrically connect the proximate armature pole 41 and the proximate contact pole 45.

The sensing switches 75 of said alarm system 20 are each associated with a portion of the tractor 10 and are of the type having a first, electrically non-conductive position indicating that the corresponding portion of the tractor 10 is undisturbed and being actuable to a second, electrically conducive position when the corresponding portion of the tractor 10 is disturbed. In the preferred embodiment of the invention, the sensing switches 75 comprise the tractor's 10 existing left door light switch 11 and right door light switch (not shown), wired in a parallel arrangement, and connected by electrical wire 74 to the sensor terminal 76. When any arming switch 29, described in more detail hereinafter, is in the "on" position, and any sensing switch 75 is actuated, the alarm system 20 is grounded, triggering the alarm system 20 as described in more detail hereinafter. Other sensing switches 75 may be added to the system 20 by electrically connecting them in a parallel arrangement such that any individual sensing switch 75 is adapted to ground the first circuit of the alarm system 20. The other sensing switches 75 may include a hood switch 12 associated with the hood 28, shown in FIG. 1, or hood hinge assembly (not shown), gas cap switches (not shown) associated with the gas tank caps 15, trailer door switches (not shown) associated with the trailer doors (not shown), pressure seat switches (not shown) associated with the driver's or passenger's seats (not shown), as well as other switches. Motion detector switches (not shown) are not preferred for use in the tractor-trailer alarm system 20 because the motion detector would be likely to give many false alarms due to wind or the frequent presence of the driver in the cab 25 of the tractor 10 at times when the alarm system is armed. Similarly, a time delay switch or mechanism (not shown) to deactivate the alarm system 20 after it has been triggered is not preferred in a tractor 10 alarm system 20 since the tractor 10 has many batteries 19, shown in FIG. 3, which would be highly unlikely to be significantly electrically drained by the triggering of the alarm system 20.

As shown in FIG. 3, the tractor-trailer alarm system 20 further comprises a second circuit which, in turn, further comprises four subcircuits, namely a medial relay circuit, a warning circuit, a distal relay circuit, and a locking circuit. The second circuit of the alarm system 20 comprises at least one tractor battery 19 connected by electrical wiring to the input arming terminals 36 of a plurality of arming switches 29 arranged in parallel such that any individual arming switch is adapted to arm the alarm system 20. In the preferred embodiment, the arming switches 29 comprise an interior arming switch 30 mounted inside the cab 25 of the tractor 10, shown in FIG. 1, and an exterior arming switch 35, shown in FIG. 3, mounted adjacent to the exterior of the tractor 10, said exterior arming switch 35 being either concealed in an exterior compartment capable of being locked, such as a tool compartment 14, shown in FIG. 1, or actuated by a key (not known). Each arming switch 29, shown in FIG. 3, is of the type which can be positioned to either an "on" and an "off" position by a key (not shown) or toggle (not shown), said "on" position being the state wherein the input arming terminal 36, shown in FIG. 3, is electrically connected to the output arming terminal 37. It is possible to install the alarm system 20 with only one arming switch 29, but this is not generally desirable for use in tractor-trailer applications.

The output arming terminals 37 of the arming switches 29 are electrically connected in parallel to an arm switch terminal 80, shown in FIG. 4, located on the rear face 26 of the control box 21, by an electrical wire 31 connected to the arm switch terminal 80 by a connector, such as screw 81. The arm switch terminal 80, in turn, is securely connected to electrical wire 84 by a crimp-lug 85 and by a connector, such as screw 82, both of which are fused with solder 86 to both wire 84 and arm switch terminal 80. This wire 84 passes through the rear face of the control box 26 and, as shown in FIG. 5, is connected by solder 87 to the armature pole 51 of the medial relay 50. The medial contact pole 55 of the medial relay 50 is electrically connected to the medial input pole 54 by wire 99 which is secured to both the medial contact pole 55 and to the medial input pole 54 by solder 70 and 72.

The second circuit of the alarm system 20 further comprises wire 91 connecting the medial armature pole 51 to the proximate armature pole 41, said wire 91 being securely fused to the medial armature pole 51 by solder 87, and to the proximate armature pole 41 by solder 47.

The second circuit of the alarm system 20 further compromises said activated proximate relay 40, which activation electrically connects the proximate armature pole 41 to the proximate contact pole 45 through the proximate armature 48. The proximate contact pole 45 is, in turn, electrically connected to the medial input pole 54 of the medial relay by a wire 97 which is fused to the proximate contact pole 45 by solder 78 and to the medial input pole 54 by solder 72. It is this subcircuit of the second circuit of the alarm system 20 which is referred to as the medial relay circuit because it is through this subcircuit that the medial solenoid is first activated when either arming switch is in the "on" position and the proximate relay 40 is activated as described above, thereby grounding the medial relay circuit of the second circuit and activating the medial solenoid 52.

The second circuit of the alarm system 20 further comprises the warning circuit which comprises said medial input pole 54 electrically connected by electrical wiring 98, shown in FIG. 5, to the siren terminal 120, shown in FIG. 4. Said wire 98 is fused to the medial input pole 54, shown in FIG. 5, by solder 72 and is joined to the siren terminal 120, shown in FIG. 4, by a crimp-lug 123 and a connector, such as screw 122, both of which are both fused to wire 98 and siren terminal 120 by solder 124.

The siren terminal 120, in turn, is connected by electrical wire 119, shown in FIG. 3, to at least one warning device, such as siren 24, an operative alarm feature of this invention. This wire 119 is secured to the siren terminal 120, shown in FIG. 4, by the siren input connector 121. Thus it can be seen that when either arming switch 29, shown in FIG. 3, is in the "on" position and the proximate armature 48 electrically connects the proximate armature pole 41 and the proximate contact pole 45 as described above, the warning circuit if the second circuit is grounded, powering the siren 24 to an operative mode.

The second circuit of the alarm system further comprises a distal relay circuit which comprises the medial input pole 54 electrically connected to the distal input pole 64 of the distal relay 60 by electrical wire 118, which wire 118, as shown in FIG. 5, is fused to the medial input pole 54 by solder 72 and to the distal input pole 64 by solder 69. Thus it can be seen in FIG. 3 that the distal relay circuit is grounded, thereby activating the distal solenoid 62 when at least one arming switch 29 is in the "on" position and the proximate armature 48 electrically connects the proximate armature pole 41 and the proximate contact pole 45 as described above.

As shown in FIG. 5, the second circuit of the alarm system 20 further comprises a locking circuit which comprises the medial input pole 54 electrically connected to the medial contact pole 55 by wire 99, which wire 99 is fused to the medial input pole 54 by solder 72 and to the medial contact pole 55 by solder 70. Thus, in FIG. 3 it can be seen that when the medial solenoid 52 is activated as described above, the medial armature 58 is shifted to electrically connect the medial armature pole 51 and the medial contact pole 55, the locking circuit of the second circuit of the alarm system 20 is grounded, thereby by-passing the medial relay circuit of the second circuit such that even if a would be thief should reset an actuated sensing switch 75, such as by closing a door, thereby breaking the first circuit, deactivating the proximate solenoid 42 and thereby causing the proximate armature 48 to shift out of contact with the proximate contact pole 45, the alarm system 20 shall continue to function until the owner of the tractor 10 disarms the alarm system 20 by means of the arming switch 29 which was initially used to arm the alarm system 20.

Figure 2:
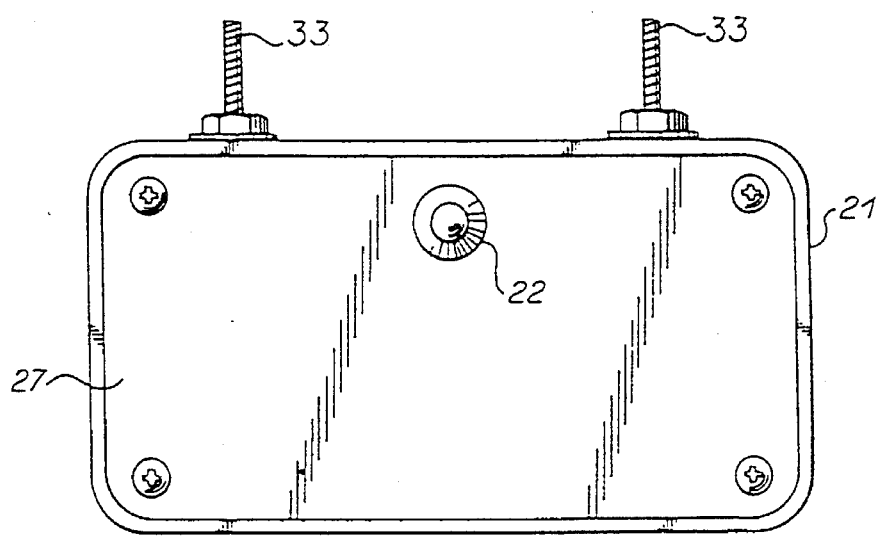
FIG. 2 is a front view of the control box.

In the preferred embodiment of the present invention, the second circuit of the alarm system 20 further comprises at least one indicator lamp, such as the interior indicator lamp 22, which interior indicator lamp 22 is electrically connected to the proximate armature pole 41 by a 24-gauge wire 92 which, as shown in FIG. 5, is fused to the proximate armature pole 41 by solder 47. The interior indicator lamp 22 is further electrically connected to the proximate output pole 46 by a 24-gauge wire 93 which is fused to the proximate output pole 46 by solder 100. In the preferred embodiment of the present invention, the interior indicator lamp is mounted so that it is visible on the front face 27 of the control box 21 as shown in FIG. 2. In the preferred embodiment of the present invention, the second circuit of the alarm system 20 further comprises an exterior indicator lamp 23, shown in FIGS. 1 and 3 positioned within the cab 25 of the tractor 10 so that it may be viewed from outside of the cab 25 through a window, such as windshield 13, shown in FIG. 1. The exterior indicator lamp 23 is electrically connected to the arm switch terminal 80 by wire 89, shown in FIG. 3, which is secured to the arm switch terminal 80, shown in FIG. 4, by a connector, such as screw 81. The exterior indicator lamp 23 is further electrically connected to the ground switch terminal 110 by wire 88, shown in FIG. 3, which is secured to the ground terminal 110, shown in FIG. 4, by a connector, such as screw 111. Thus it can be seen in FIG. 3 that once any arming switch 29 has been set to the "on" position, the second circuit of the alarm system is grounded, and the interior indicator lamp 22 and the exterior indicator lamp 23 will be powered to illuminate, indicating to persons both inside and outside the tractor 10 that the alarm system 20 has been armed.

Referring again to FIG. 3, the alarm system 20 further comprises a third circuit including at least one tractor battery 19 and the tractor ignition switch 17 electrically connected in series to the ignition terminal 130, shown in FIG. 4, on the rear face of the control box 26 by wiring 117, which wiring 117 is secured to the ignition terminal 130 by a connector, such as screw 131. The third circuit of the alarm system 20 further comprises the ignition terminal 130 electrically connected to the distal armature pole 61 of the distal relay 60, shown in FIG. 5, by electrical wire 129 which passes through the rear face of the control box 26, shown in FIG. 4. Said wire 129 is fused to the distal armature pole 61 by solder 104 and is connected to the ignition terminal 130 by a crimp-lug 133 and a connector, such as screw 132, both of which are fused to both said wire 129 and the ignition terminal by solder 134. As shown in FIG. 3, when the distal solenoid 62 is inactive, the normally closed distal armature 68 electrically connects the distal armature pole 61 and the distal contact pole 65.

The third circuit of the alarm system 20 further comprises the distal contact pole 65, shown in FIG. 5, connected to the pump terminal 140, shown in FIG. 4, by wire 139 which passes through the rear face of the control box 26. Said wire 139 is fused to the distal contact pole 65 by solder 105, as shown in FIG. 5, and, as shown in FIG. 4, is connected to the pump terminal 140 by a crimp-lug 133 and a connector, such as screw 142, both of which are fused to wire 139 and the pump terminal 140 by solder 144. The pump terminal 140 is, in turn, electrically connected to a critical electrical component of the internal combustion engine (not shown) of the tractor 10, such as the fuel pump 18, shown in FIG. 3, by electrical wiring 114, which is secured to the pump terminal 140 by a connector, such as screw 142. Thus, regardless of the position of either of the arming switches 29, that is, regardless of whether one, both, or none of the arming switches 29 are "on" or "off", it can be seen that the fuel pump 18 is powered to an operative mode when the ignition switch 17 of the tractor 10 is in an operative mode.

However, when at least one of the arming switches 29 is in the "on" position and one of the sensing switches 75 is actuated, thereby activating the proximate solenoid 42, which, in turn, connects the proximate armature pole 41 and the proximate contact pole 45, which connection in turn activates the distal solenoid 62 of the distal relay 60 as described above, the electrical connection between the distal armature pole 61 and the distal contact pole 65 is broken as the distal armature 68 is shifted out of contact with the distal contact pole 65. This disconnection causes the fuel pump 18 to become inoperable, shutting down the engine (not shown) of the tractor 10, if running, or, if not running, preventing the engine (not shown) from being started until the owner of the tractor 10 deactivates the alarm system 20 as described above. The third circuit of the alarm system 20 may also be employed to connect the ignition switch 17 to any one of a number of critical electrical components (not shown) of the tractor 10, shown in FIG. 1, such as the starter (not shown), or the spark plugs (not shown) of a gasoline engine (not shown). However, because tractors are equipped primarily with diesel engines (not shown) and are often left unattended while running, it is preferred in the present invention that the third circuit be connected to the fuel pump 18.

It can thus be seen that when any arming switch 29, shown in FIG. 3, is in the "on" position and the proximate solenoid 42 of the proximate relay 40 is activated by the actuation of any of the sensing switches 75, the proximate armature 48 is shifted to power the siren 24 to an operative mode, providing the desired alarm, while at the same time activating the medial solenoid 52 and the distal solenoid. The activation of the distal solenoid 62 causes the distal armature 68 to shift, disconnecting the flow of electricity to the fuel pump 18, thereby preventing the truck 10 from being driven away. At the same time, the activation of the medial solenoid 52 shifts the medial armature 58 into contact with the medial contact pole 55 to ground the alarm system 20 and by-pass the sensing switches 75, causing the alarm system 20 to remain in a triggered state, even if the sensing switch 75 is reset, until the alarm system 20 is disarmed by means of the arming switch 29 which was used to initially arm it.

In the preferred embodiment of the present invention, the relays 40, 50, and 60 are secured to each other and to a common base 150 with an adhesive, such as glue 32, as shown in FIG. 5. This base 150, in turn, is inserted into a fitted slot (not shown) within the control box 21 and secured therein to the control box 21 by glue (not shown). The control box 21, in turn, is secured inside the cab 25 of the tractor by at least one securing member, such as bolts 33, shown in FIGS. 2 and 4.

In the preferred commercial embodiment of the present invention, the alarm system 20 is purchased by a consumer as part of a kit (not shown) containing instructions (not shown) for the installation of the alarm system 20 into the tractor. The kit (not shown) contains all components of the alarm system 20 and includes instructions for mounting various elements of the alarm system 20 (not shown), instructions for wiring various elements of the alarm system 20 (not shown) and instructions for operating the alarm system 20 (not shown).

While several embodiments of the present invention have been disclosed, it is to be understood by those skilled in the art of tractor-trailer theft prevention alarm systems that other forms can be adopted, all coming within the spirit of the invention and scope of the appended claims:

I claim:

1. In a tractor of the type having a cab, an internal combustion engine, an electrical system, an ignition switch, a fuel pump, one or a plurality of door light switches, and an electrical power supply, a tractor-trailer alarm system comprising:

at least one arming switch which is positioned to arm said alarm system;

at least one sensing switch associated with a portion of the tractor, said switch being normally in a first, electrically non-conducive position indicating that the corresponding portion of the tractor is undisturbed and being actuable to a second, electrically conducive position when the corresponding portion of the tractor is disturbed;

a proximate electromagnetic relay electrically connected to said sensing switch, said proximate relay comprising an input pole connected in series to an output pole through a solenoid and thence to ground, and further comprising an armature pole electrically connected to a contact pole through an armature when said proximate relay is activated;

a medial electromagnetic relay electrically connected to said proximate relay, said medial relay comprising an input pole connected in series to an output pole through a solenoid and thence to ground, and further comprising an armature pole electrically connected to a contact pole through an armature when said medial relay is activated;

a distal electromagnetic relay electrically connected to said medial relay, said distal relay comprising an input pole connected in series to an output pole through a solenoid and thence to ground, and further comprising an armature pole electrically connected to a contact pole through an armature when said distal relay is inactive;

at least one warning device electrically connected to said medial relay; a first circuit comprising said electrical power supply connected in series to the input pole of said proximate relay through said sensing switch when said sensing switch is actuated, the output pole of said proximate relay being electrically grounded such that said proximate relay becomes activated when said sensing switch is actuated;

said activated proximate relay forming a medial relay circuit comprising said electrical power supply connected to the armature pole of said proximate relay through said arming switch when said arming switch is in an "on" position, said armature pole of said proximate relay being further electrically connected to the contact pole of said proximate relay when said proximate relay is in an activated mode, said contact pole of said proximate relay being further electrically connected in series to the input pole of said medial relay, said input pole of said medial relay being connected in series to the contact pole of said medial relay through said medial solenoid, said output pole of said medial relay being electrically grounded such that when said arming switch is in an "on" position and said proximate relay is activated, said medial relay circuit is grounded and said medial relay activated;

said activated medial relay forming a locking circuit comprising said electrical power supply connected to the armature pole of said medial relay through said arming switch when said arming switch is in an "on" position, said armature pole of said medial relay being further electrically connected to the contact pole of said medial relay when said medial relay in is an activated mode, said contact pole of said medial relay being electrically connected to said input pole of said medial relay, said input pole of said medial relay being connected in series to the contact pole of said medial relay through said medial solenoid, said contact pole of said medial relay being electrically grounded such that when said medial relay is activated said armature of said medial relay electrically connects said electrical power supply to said input pole of said medial relay grounding said locking circuit such that said medial relay remains activated irrespective of the actuated status of said sensing switch;

said activated medial relay forming a warning circuit comprising said electrical power supply connected to the armature pole of said medial relay through said arming switch when said arming switch is in an "on" position, said armature pole of said medial relay being further electrically connected to the contact pole of said medial relay when said medial relay in is an activated mode, said contact pole of said medial relay being electrically connected to said warning device and thence to ground such that when said medial relay is activated said armature of said medial relay electrically connects said electrical power supply to said warning device, grounding the warning circuit such that the warning device is powered to an operative mode;

said activated medial relay forming a distal relay circuit comprising said electrical power supply connected to the armature pole of said medial relay through said arming switch when said arming switch is in an "on" position, said armature pole of said medial relay being further electrically connected to the contact pole of said medial relay when said medial relay in is an activated mode, said contact pole of said medial relay being electrically connected to said input pole of said distal relay, said input pole of said distal relay being further connected in series to the contact pole of said distal relay through said distal solenoid, said contact pole of said distal relay being electrically grounded such that when said medial relay is activated, said armature of said medial relay electrically connects said electrical power supply to said input pole of said distal relay, grounding the distal relay circuit such that the distal relay is activated;

a third circuit comprising said electrical power supply connected to the armature pole of said distal relay, said armature pole of said distal relay being further electrically connected to the contact pole of said distal relay by the armature of said distal relay, said contact pole being further electrically connected to a critical electrical component of the engine of said tractor such that the critical electrical component is powered to an operative mode when said ignition switch is in an operable mode and said distal relay is not activated, the activation of said distal relay electrically disconnecting said critical electrical component from said electrical power supply.

2. An alarm system in accordance with claim 1 wherein said proximate relay, said medial relay, and said distal relay comprise electromagnetic relays of the type designed to carry at least thirty amperes of electrical current.

3. An alarm system in accordance with claim 1 wherein the electrical connections between the poles of the proximate, medial, and distal relays, other than the electrical connections internal to said proximate, medial and distal relays, comprise electrical wire of at least 20-gauge thickness.

4. An alarm system in accordance with claim 3 wherein said electrical wire is of 14-gauge thickness.

5. An alarm system in accordance with claim 3 wherein said electrical wire is joined to its associated poles by solder.

6. An alarm system in accordance with claim 1 wherein the proximate, medial, and distal relays are enclosed within a control box having a rear face, said rear face having a plurality of terminals for the connection of electrical wiring.

7. An alarm system in accordance with claim 6 wherein the electrical connections between the poles of the proximate, medial, and distal relays and the terminals on the rear face of said control box comprise 14-gauge electrical wire, said wire being joined to the associated poles of the proximate, medial, and distal relays by solder, and said wire being secured to the associated terminals on the rear face of the control box by the combination of an associated crimp-lug held in place with an associated connector, both said crimp-lug and said connector being joined to both said wire and said terminal by solder.

8. An alarm system in accordance with claim 1 having a plurality of sensing switches comprising the existing door light switches of the tractor wired in parallel such that the actuation of any door light switch triggers said alarm system when said arming switch is in the "on" position.

9. An alarm system in accordance with claim 1 having a plurality of arming switches comprising an interior arming switch located within the cab of the tractor, and an exterior arming switch located adjacent to the exterior of the tractor, said arming switches wired in parallel such that said alarm system is armed when either arming switch is in an "on" position.

10. An alarm system in accordance with claim 9 wherein said exterior arming switch comprises a switch of the type which can be operated with a key.

11. An alarm system in accordance with claim 9 wherein said exterior arming switch is concealed in an exterior compartment of said tractor capable of being locked.

12. An alarm system in accordance with claim 1 wherein said third circuit further comprises the ignition switch of said tractor electrically connected between said electrical power supply and said critical electrical component of the engine of said tractor.

13. An alarm system in accordance with claim 1 wherein said critical electrical component of the engine of the tractor comprises the fuel pump of said tractor.

14. An alarm system in accordance with claim 1 wherein said medial relay circuit further comprises at least one indicator lamp electrically connected such that when said arming switch is in an "on" position, said lamp is grounded, powering said indicator lamp to illuminate, indicating the armed status of the alarm system.

15. An alarm system in accordance with claim 14 wherein said indicator lamp comprises an interior indicator lamp and an exterior lamp electrically connected in parallel such that when said arming switch is in an "on" position, said internal and external lamps are grounded, powering both said indicator lamps to illuminate, indicating the armed status of the alarm system.

16. An alarm system in accordance with claim 6 wherein said proximate, medial, and distal relays are secured to each other with an adhesive, said proximate, medial, and distal relays being further attached to a common base.

17. An alarm system in accordance with claim 6 wherein the proximate, medial and distal relays are secured inside the control box with an adhesive.

18. A kit for use by a consumer to install a tractor-trailer alarm system into a tractor of the type having a cab, an internal combustion engine, an electrical system, an ignition switch, a fuel pump, one or a plurality of door light switches, and an electrical power supply comprising:

a control box having at least one securing member and having a plurality of terminals for the connection of electrical wiring, said terminals comprising an arming terminal, a siren terminal, a sensor terminal, an ignition terminal, a pump terminal, and a ground terminal;

at least one warning device;

an indicator lamp;

a plurality of arming switches;

a plurality of electrical wires;

instructions for the installation of said alarm system into said tractor by said consumer, said instructions comprising instructions for the mounting of said control box, instructions for the mounting of said warning device, instructions for the mounting of said arming switches, instructions for wiring said arming switches to said arming terminal and to said electrical power supply, instructions for wiring said sensor terminal to the door light switches of the tractor, instructions for wiring said warning device to said siren terminal, instructions for wiring said indicator lamp to said arming terminal and said ground terminal, instructions for wiring said ground terminal to the tractor, instructions for wiring said ignition terminal to said ignition switch, instructions for wiring said pump terminal to said fuel pump, and instructions for the operation of said alarm system.

19. A kit in accordance with claim 18 wherein the electrical wires comprise wires of 14-gauge thickness.

20. A kit in accordance with claim 18 wherein the arming switches comprise an interior arming switch and an exterior arming switch.

* * * * *